(12) United States Patent
Adelaide et al.

(10) Patent No.: US 7,277,964 B2
(45) Date of Patent: Oct. 2, 2007

(54) DATA ROUTING AND PROCESSING DEVICE FOR FLEXIBLY PERFORMING DIFFERENT FUNCTIONALITIES USING MULTIPLE DISTINCT PROCESSORS

(75) Inventors: Joseph Adelaide, Montigny le Bretonneux (FR); Robin Didier, Meudon la Foret (FR)

(73) Assignee: NXP B.V., Eindhoven (NL)

( * ) Notice: Subject to any disclaimer, the term of this patent is extended or adjusted under 35 U.S.C. 154(b) by 336 days.

(21) Appl. No.: 10/222,219

(22) Filed: Aug. 16, 2002

(65) Prior Publication Data

US 2003/0051050 A1 Mar. 13, 2003

(30) Foreign Application Priority Data

Aug. 21, 2001 (FR) .................................... 0110960

(51) Int. Cl.
*G06F 13/00* (2006.01)
*G06F 12/00* (2006.01)
*G06F 3/00* (2006.01)

(52) U.S. Cl. ............................. 710/3; 710/33; 711/202; 711/207

(58) Field of Classification Search .................. 710/36, 710/38, 3; 358/403; 370/217, 352; 348/722; 375/240.25; 711/202, 207

See application file for complete search history.

(56) References Cited

U.S. PATENT DOCUMENTS

| 5,204,949 | A | * | 4/1993 | Yasue et al. ................. 709/214 |
| 5,365,520 | A | * | 11/1994 | Wang et al. ................. 370/217 |
| 6,286,059 | B1 | * | 9/2001 | Sugiura ........................ 710/14 |
| 6,510,152 | B1 | * | 1/2003 | Gerszberg et al. .......... 370/352 |
| 6,600,520 | B1 | * | 7/2003 | Ward et al. .................. 348/722 |
| 6,614,559 | B2 | * | 9/2003 | Olin ............................ 358/403 |
| 2003/0185306 | A1 | * | 10/2003 | MacInnis et al. ....... 375/240.25 |

* cited by examiner

*Primary Examiner*—Kim Huynh
*Assistant Examiner*—Joshua D. Schneider

(57) ABSTRACT

The present invention relates to a data routing and processing device comprising a data bus, a router for managing communications on the data bus, data processing unit and a local memory for temporarily storing data. A transmitting processing unit transmits to the router an identifier. The router comprises a communication table which enables it to determine the receiving processing unit based on the identifier. The router ensures a communication between the transmitting processing unit and the receiving processing unit depending on a value of an availability register. If the receiving processing unit is available, the data transfer is direct; if not, the data transfer takes place via the local memory.

12 Claims, 4 Drawing Sheets

DATA ROUTING AND PROCESSING DEVICE FOR FLEXIBLY PERFORMING DIFFERENT FUNCTIONALITIES USING MULTIPLE DISTINCT PROCESSORS

FIELD OF THE INVENTION

The present invention relates to a data processing device comprising a data bus, a router (1) able to manage communications on the data bus, at least one data processing unit able to transfer data, at least one processing unit able to receive date, and a local memory able to temporarily store data.

The invention finds its application in multimedia data (i.e. MPEG data) processing devices such as, for example set top boxes, adapted to perform video transcoding and decoding.

BACKGROUND OF THE INVENTION

In MPEG video data coding and decoding architectures, various communication schemes have been used so far for permitting the transfer of video data between various processing units. The processing units comprise co-processors implementing functions such as, for example, a variable-length decoding, an inverse quantification, or an inverse discrete cosine transform. For MPEG video data which have a variable size by nature, the data communication architecture that is the most relevant comprises queue memories or FIFO memories (First In First Out), a data bus and a local memory connected to the data bus. The video data are transmitted from a transmitting co-processor to a receiving co-processor via a data bus in the form of packets whose size depends on the granularity of the queues. This transmission of packets of video data is effected by utilizing a push-pop mechanism which consists of popping the video data packet by packet out of the queue memory associated to the transmitting co-processor so as to store them in the local memory, these packets being later pushed in the queue memory of the receiving processor from the local memory. Although such a data architecture permits a certain flexibility of operation, it is particularly costly in terms of bandwidth because of the many data transfers over the data bus for which the communication must be effected via the local memory.

SUMMARY OF THE INVENTION

It is an object of the present invention to propose a data processing device which is less costly in terms of bandwidth (2).

For this purpose, said data processing device is characterized in that the receiving data processing unit is able to deliver an availability signal to the router and in that the router is able to authorize the transfer of the data transmitted by the transmitting processing unit to the local memory or to the receiving processing unit as a function of a value of the availability signal.

The data processing device according to the invention thus directly transmits the data from the transmitting processing unit to the receiving processing unit if the value of the availability signal of said receiving processing unit so authorizes. Such a possibility thus permits to reduce the bandwidth. Said data processing device also offers the advantage of having a small latency and having a more flexible operation than that of the prior art.

BRIEF DESCRIPTION OF THE DRAWINGS

These and other aspects of the invention are apparent from and will be elucidated, by way of non-limitative example, with reference to the embodiment described hereinafter.

In the drawings.

DESCRIPTION OF PREFERRED EMBODIMENTS

The present invention relates to a data processing and routing architecture comprising a router responsible for managing communications between a transmitting data processing unit and a receiving data processing unit, the data processing architecture comprising various processing units. The data processing architecture has been developed more particularly for MPEG video data communication but is applicable to communications of any type of data between processing units via a data bus managed by a router.

Figure 1:
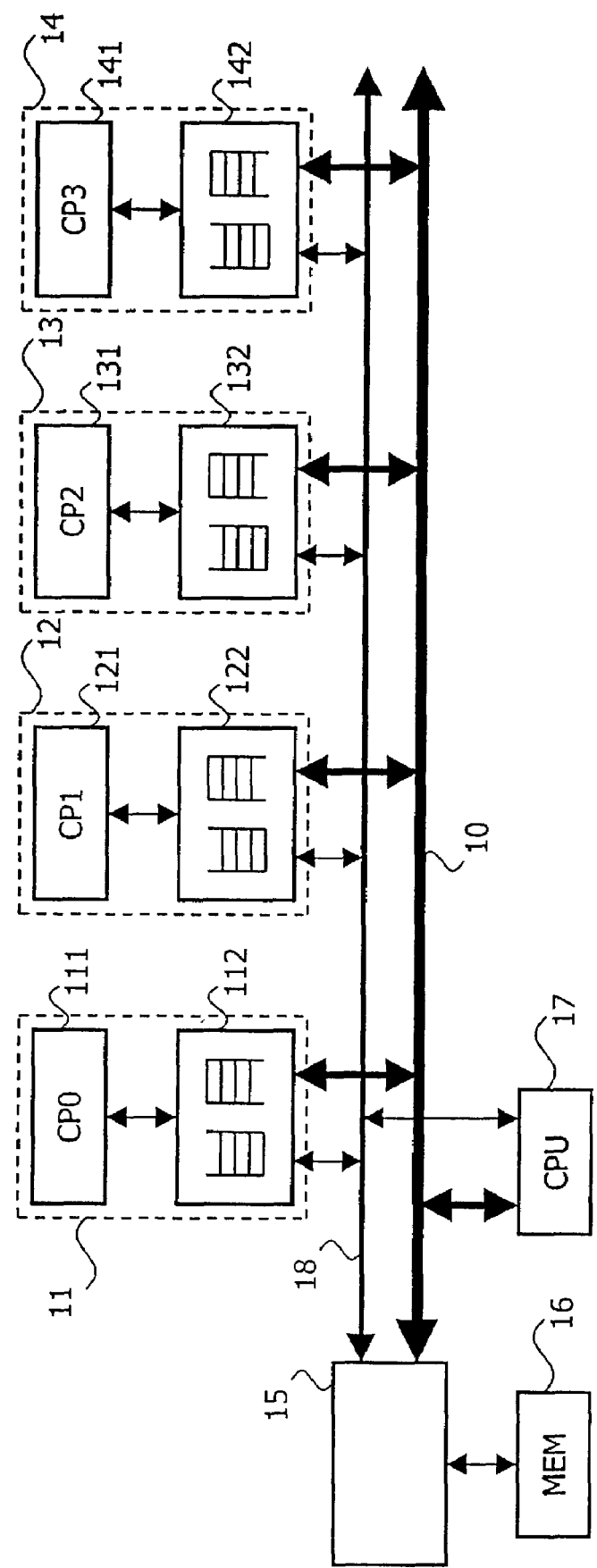
FIG. 1 shows a data processing architecture according to the invention.

FIG. 1 illustrates a data processing architecture according to the invention. Said architecture comprises the following elements a data bus (10) for the data flow;

a control bus (18) for the flow of control information;

a set of processing units (11, 12, 13, 14), that is to say, at least one processing unit able to transmit data (11) and at least one processing unit able to receive data (12). A processing unit comprises a co-processor CP0 (111), CP1 (121), CP2 (131) or CP3 (141) associated to a communication interface (112, 122, 132, or 142). Said communication interface is able to temporarily store the data coming from the co-processor so as to send them over the data bus during a data transmission or to store the data coming from the data bus so as to process them by the co-processor during a reception of data. The communication interface comprises here two memories of the FIFO type, one at the transmitter end and one at the receiver end. The co-processor implements a data processing function which is in the case of the processing of MPEG data a variable-length coding VLC, a quantification Q of the coded data, or a discrete cosine transformation DCT of the data quantified to cite only a few examples;

a router (15) capable of managing requests coming from the processing units and of managing the routing of the data over the data bus;

a local memory (16) able to temporarily store data coming from a transmitting processing unit (11). The local memory is here connected directly to the router. It can also be connected to the data bus if the router manages all the communications requested by a transmitting processing unit to a receiving processing unit;

a central processing unit CPU (17).

Figure 2:
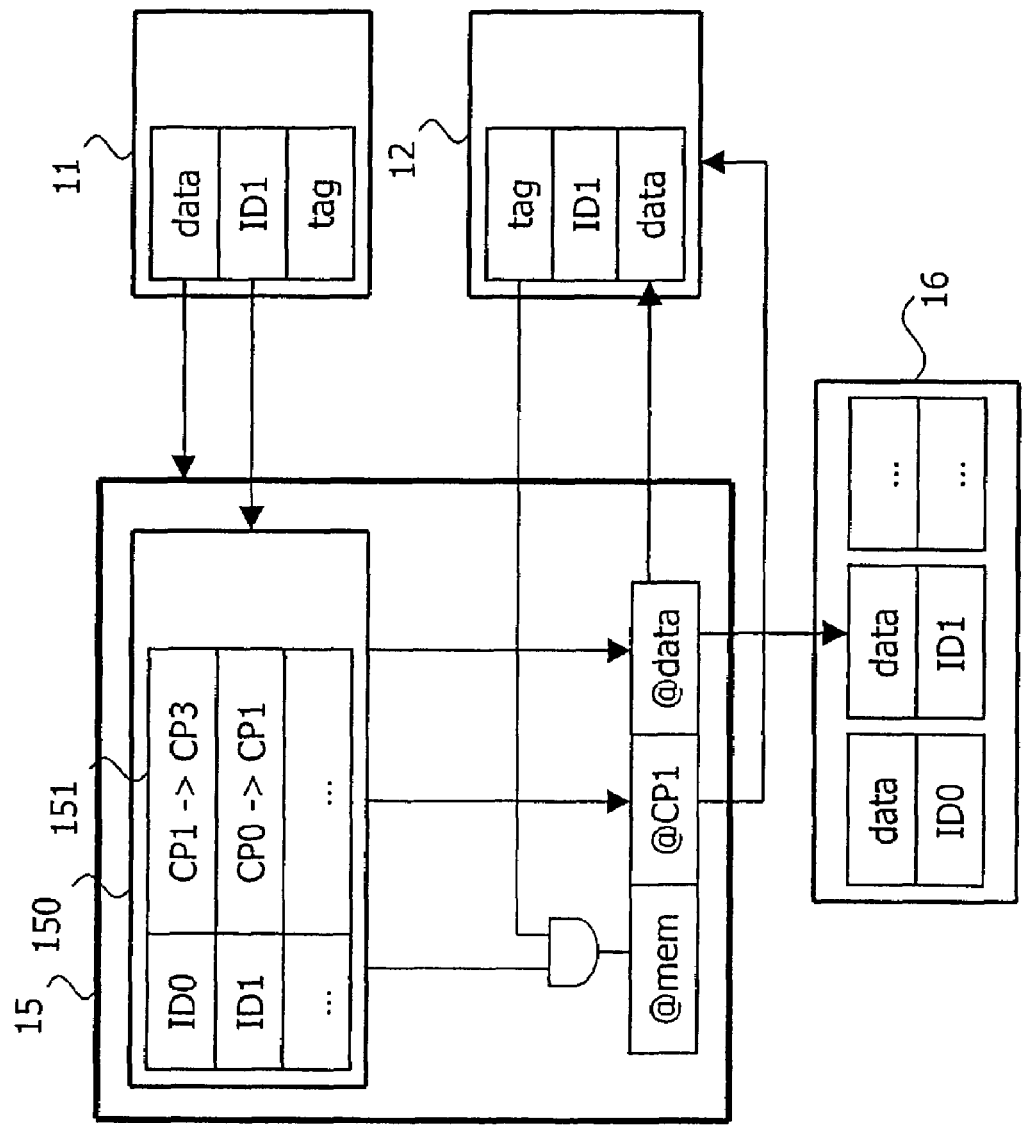
FIG. 2 illustrates a data communication between a transmitting processing unit and a receiving processing unit.

FIG. 2 shows more particularly the way in which the data are communicated between two processing units by the router.

A co-processor of a transmitting data processing unit (11) loads the data packets that it has just processed in a memory of the communication interface. Each data packet contains data (data) and an identifier (ID) that features the type of data to be transferred to a receiving data processing unit (12). The identifier is transmitted to the router so as to determine the receiving processing unit (12). For this purpose, said router comprises a control circuit (150) itself containing a communication table (151) which contains the correspondence between an identifier (ID0, ID1,. . .) and a communication link (CP1->CP3, CP0->CP1,. . .) for each of the communication links defined between the processing units for a given functionality. To implement this communication table, the router comprises, for example, communication registers dedicated to each processing unit connected to the router by the control bus. The communication registers are used for transporting data descriptors from a transmitting processing unit to a receiving processing unit. A first descriptor contains the address of the data processed by the transmitting processing unit (@data), the address of the receiving processing unit (@CP1) and the identifier (ID1). The transmission of the address of the data processed by the transmitting processing unit (@data) is necessary because the local memory (16) may contain data packets that have not yet been transferred. This address permits the router to know the position of the data packet to be transferred to the address of the receiving processing unit (@CP1).

The router thus knows the receiving data processing unit (12) from the identifier (ID1) and from the communication table (151). Said router will then read an availability register (tag) of the receiving data processing unit indicating whether a memory of its communication interface is available or not to receive data. If the value of the availability register is equal to 0, the router informs the receiving processing unit that a data is intended for it, then it authorizes a direct transfer via the data bus of the data packet processed by the transmitting processing unit to the receiving processing unit. If the value of the availability register is equal to 1, the router permits a transfer of the data packet that is processed by the transmitting processing unit to the local memory which temporarily stores these data while waiting for the memory of the communication interface of the receiving processing unit to be available. The transfer of data is effected, for example, according to the push-pop mechanism described earlier.

In a particularly advantageous embodiment, the router comprises a programmable communication table. The fact of using a programmable communication table permits to realize a multi-application architecture suitable for managing various data processing sequences independently of each other, each processing sequence implementing different communication links between various processing units, some processing units being common to several processing sequences. The communication table, programmed for each application, thus authorizes a flexible operation of the data processing device according to the invention with the possibility of effecting various types of data processing such as, for example, a coding, a decoding or a transcoding of video data according to various standards such as, for example, JPEG, MPEG-1, MPEG-2, MPEG-4, H-261, and H-263.

Figure 3:
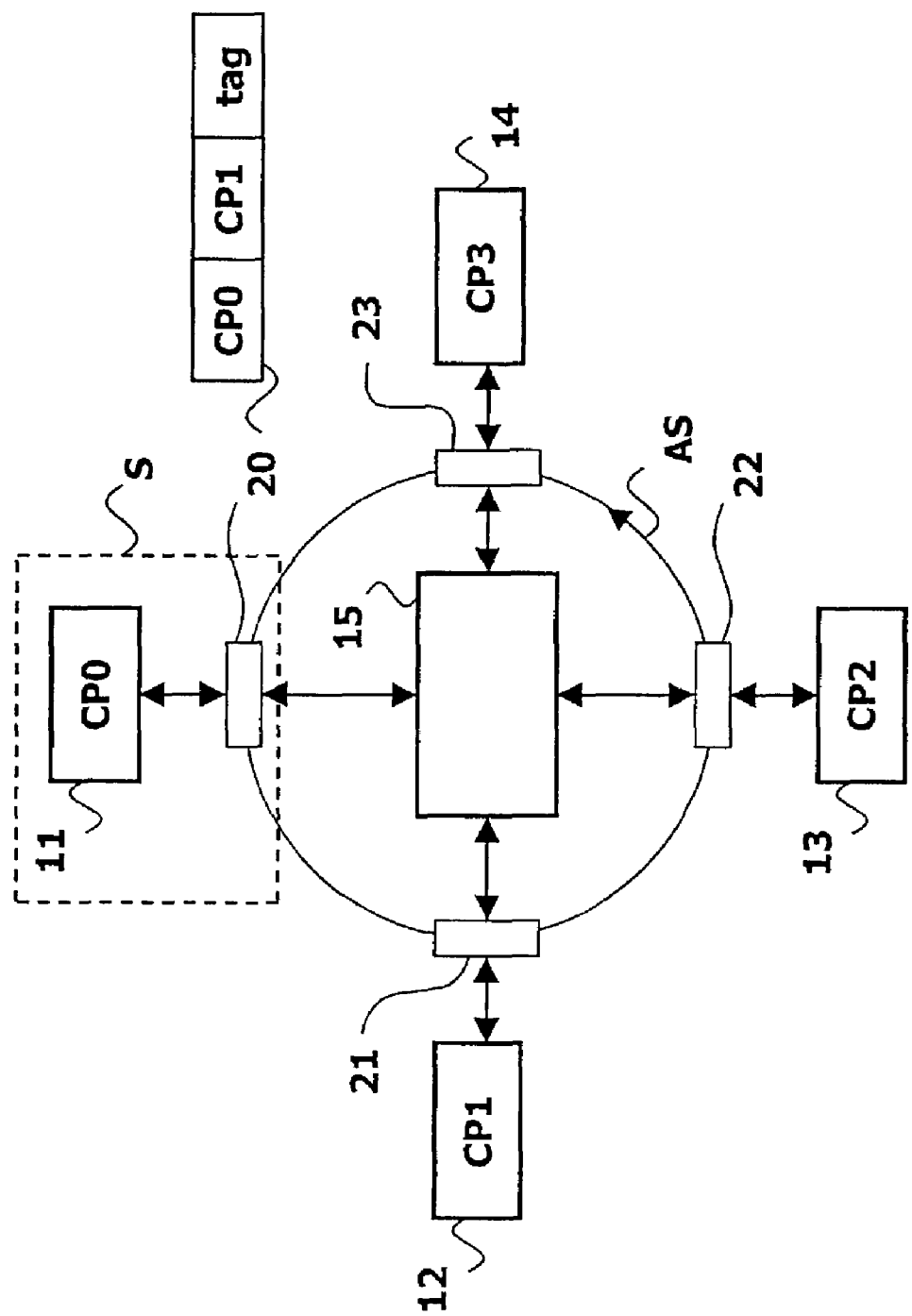
FIG. 3 illustrates the management by the router of a set of processing units and FIG. 4 gives a particular example of an embodiment of the data processing architecture in the case of MPEG-type video data.

The router (15) must be able to manage requests coming from various processing units. FIG. 3 illustrates the management by the router of a set of processing units. In order to manage the various processing units (CP0, CP1, CP2, CP3), the router comprises communication registers (20 to 23) dedicated to each processing unit connected to the router by the control bus. The communication registers contain a second descriptor which contains the address of the transmitting processing unit (CP0), the address of the receiving processing unit (CP1) and the value of the availability register (tag) of the receiving processing unit. The router implements an access scheme (AS) featured by various states (S) run through in a predetermined way, a state (S) constituting a possibility of data transfer from one processing unit to another depending on the value of the availability register. The access scheme obeys, for example, an arbiter system called Round Robin, each processing unit having the disposal of a time slot during which the transfer can be effected.

This arbiter system ensures the communications between two processing units. But before a communication is ensured between the transmitting processing unit (CP0) and the receiving processing unit (CP1), it receives a request from the transmitting processing unit and verifies whether the receiving processing unit is ready to receive the data depending on the value of the availability register. When the receiving processing unit is not available, the router allocates the data bus to the transmitting processing unit for the latter to transfer the data directly to the local memory. These data will be addressed at a later stage at the receiving processing unit. In the opposite case, the router allocates the data bus for a data communication from the transmitting processing unit to the receiving processing unit.

Figure 4:
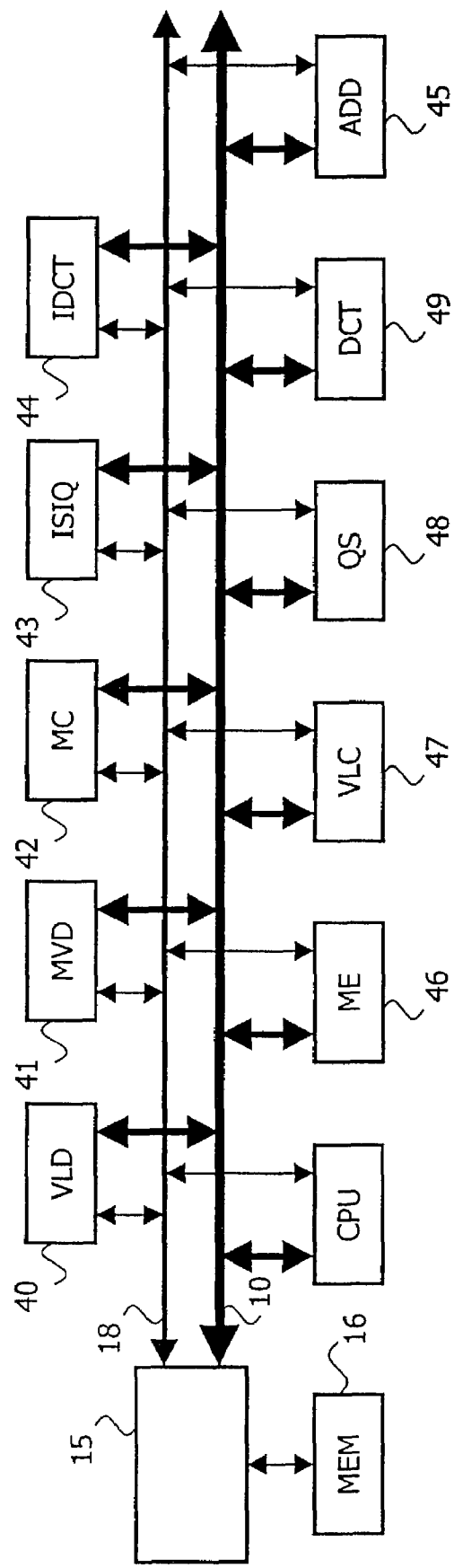

FIG. 4 gives an example of an embodiment of the data processing and routing architecture in the case of MPEG video data. The architecture of the processing ensures a coding and a decoding of MPEG data and comprises, besides the router (15), a data bus (10) and a control bus (18), a local memory MEM (16) and a central processing unit CPU (17), the following processing units:

a variable-length decoding unit VLD (40)

a motion vector decoding unit MVD (41)

a motion compensation unit MC (42)

a zigzag inverse scanning and inverse quantification unit ISIQ (43)

an inverse discrete cosine transform unit IDCT (44)

an image reconstruction unit ADD (45)

a motion estimation unit ME (46)

a variable-length coding unit VLC (47)

a zigzag quantification and scanning unit QS (48) and a discrete cosine transformation unit (49).

In the case of a decoding of coded data, for example, the communication table is programmed as follows:

| | |
|---|---|
| ID0 | VLD -> MVD |
| ID1 | MVD -> MC |
| ID2 | VLD -> ISIQ |
| ID3 | ISIQ -> IDCT |
| ID4 | IDCT -> ADD |
| ID5 | MC -> ADD |

In another single data transcoding example without motion compensation, the communication table is programmed as follows:

| | |
|---|---|
| ID0 | VLD -> ISIQ |
| ID1 | ISIQ -> QS |
| ID2 | QS -> VLC |

The transfer of the data from one processing unit to another and the management of the various processing units is effected according to the principles described in FIGS. 2 and 3, respectively.

The description above with reference to FIGS. 1 to 4 illustrates the invention rather than limits it. It is evident that numerous alternatives exist which fall within the scope of the appended claims. There are many ways of implementing the functions described by means of items of hardware. With respect thereto, FIG. 4 is highly diagrammatic. Although this Figure shows various functions in the form of separate blocks, this does not exclude that a single item of hardware carries out various functions. Neither does this exclude that a function can be effected by a set of items of hardware.

No reference sign in brackets in the present text is to be interpreted in a limiting fashion. The verb "to comprise" and its conjugations also has to be interpreted in a wide manner, that is to say, as not excluding the presence of other elements than those listed after said verb.

The invention claimed is:

1. A data processing system comprising:
   a data bus;
   at least one transmitting processing unit able to transmit data over the data bus;
   at least one memory connected to the data bus and able to temporarily store data;
   at least one receiving processing unit able to receive data over the data bus; and
   a router including a programmable communication table connected to the data bus and able to manage communications over the data bus, wherein the programmable communication table includes at least one pairing between the processing units corresponding to a data processing sequence performing a given functionality and the router receives an identifier from a respective transmitting processing unit and in response determines an intended receiving processing unit using the programmable communication table, and wherein the intended receiving processing unit provides an availability signal to the router and in response the router authorizes a data transfer from the respective transmitting processing unit to the local memory or to the intended receiving processing unit based on a value of the availability signal.

2. The data processing system of claim 1, wherein the router further comprises a communication register for each of the at least one transmitting processing unit and the at least one receiving processing unit.

3. The data processing system of claim 2, further comprising a control bus, wherein the at least one transmitting processing unit, the at least one receiving processing wait, and each communication register for the at least one transmitting processing unit and the at least one receiving processing unit are connected to the control bus.

4. The data processing system of claim 3, wherein each communication register stores an address of a transmitting processing device, an address of a receiving processing device, and a value of an availability signal.

5. The data processing system of claim 1, wherein the data processing system comprises a set top box.

6. The data processing system of claim 5, wherein given functionality comprises MPEG video data coding and decoding.

7. A data processing system comprising:
   a data bus;
   a control bus;
   a plurality of processing units able to transmit and receive data over the data bus and control information over the control bus;
   at least one memory connected to the data bus and able to temporarily store data; and
   a router including a programmable communication table connected to the data bus and the control bus and able to manage communications over the data bus, wherein the router receives over the control btis an identifier from a processing unit transmitting data and responsively determines a respective processing unit to receive the data using the programmable communication table, and wherein the respective receiving processing unit provides over the control bus an availability signal to the router and in response the router authorizes a data transfer from the processing unit transmitting the data to the local memory or to the respective receiving processing unit based on a value of the availability signal, wherein the programmable communication table includes at least one pairing between the proccessing units corresponding to a data processing sequence for performing a given functionality.

8. The data processing system of claim 7, wherein the router further comprises a communication register for each processing unit.

9. The data processing system of claim 7, wherein each communication register stores an address of a transmitting processing device, an address of a receiving processing device, and a value of an availability signal.

10. The data processing system of claim 7, wherein the given functionality comprises MPEG video data coding and decoding.

11. A method of managing data communications over a data bus between a plurality of processing units comprising:
    programming a communication table to include at least one pairing between the plurality of processing units corresponding to a data processing sequence for performing a given functionality;
    providing an identifier by a proccessing unit that is transmitting data;
    determining a respective processing unit to receive the data based on the identifier and the communication table;
    providing an availability signal by the respective processing unit receiving the data; and
    transferring the data from the transmitting processing unit to a local memory or to the receiving processing unit based on the value of the availability signal.

12. The method of claim 11, wherein given functionality comprises MPEG video data coding and decoding.

* * * * *